Figure 1:
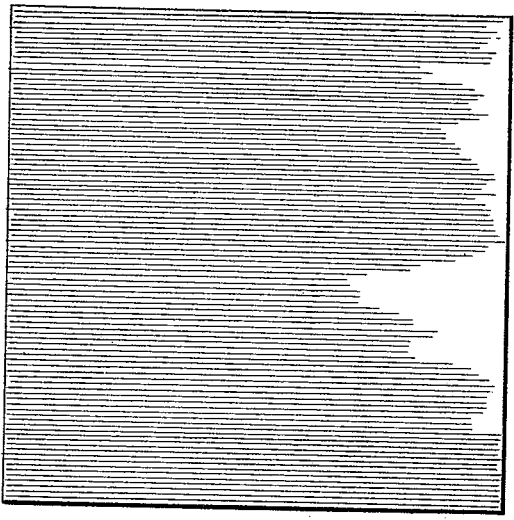

(No Model.)

E. F. AYRES.
PRESERVING FRUIT, &c.

No. 437,323. Patented Sept. 30, 1890.

WITNESSES:

INVENTOR
Edward F. Ayres
BY ____ ATT'Y.

UNITED STATES PATENT OFFICE.

EDWARD F. AYRES, OF DANBURY, CONNECTICUT, ASSIGNOR OF ONE-HALF TO TIMOTHY H. FOSTER, OF SAME PLACE.

PRESERVING FRUIT, &c.

SPECIFICATION forming part of Letters Patent No. 437,323, dated September 30, 1890.

Application filed November 23, 1889. Serial No. 331,354. (No model.)

*To all whom it may concern:*

Be it known that I, EDWARD F. AYRES, a citizen of the United States, residing at Danbury, in the county of Fairfield and State of Connecticut, have invented certain new and useful Improvements in Means for Preserving Fruits and Vegetables; and I do hereby declare the following to be a full, clear, and exact description of the invention, such as will enable others skilled in the art to which it appertains to make and use the same.

My invention has reference to a certain new and useful improvement in means for preserving fruit and vegetables in their natural ripened condition, and has for its object to preserve from one season to the next the weight, solidity, flavor, and acidity of the fruit or vegetable without imparting thereto in the slightest degree any foreign taste or injurious effect.

It has been essayed to preserve fruits and the like by sealing the same within air and moisture tight boxes; but while this will undoubtedly keep the fruit in good condition still it is a fact that when exposed to the air the fruit so kept will shrivel and decay to such an extent that a dealer cannot afford to keep the fruit in stock. This is due to the fact that the air-tight boxes do not prevent the exudation of the acid or the evaporation of the volatile oil through the skin or rind of the fruit. As is well known, many fruits—as oranges, lemons, grape-fruit, and the like—have an outer rind which is very porous and full of volatile oil and an interior coating of thick dead fungus which has a great affinity for moisture, and if the oil evaporates the atmospheric air and moisture will readily strike through said rind and be absorbed by the interior fungus, the result being that the rind will mold and cause the fruit to ferment and spoil. Something further is essential besides the mere exclusion of air and moisture from the fruit and vegetables. It is necessary to prevent the evaporation of the volatile oils in the rind of the fruit, and it is also necessary to preserve every particle of acid in the fruit, so that when the fruit is finally exposed to the air it will not readily invite decay, but will retain its weight, solidity, flavor, and acidity as long as it would if just plucked.

Various ways have been devised for preserving fruit by an external coating; but a foreign flavor is thereby imparted to the fruit and even though such flavor be agreeable, still it is unnatural, and fruit so coated cannot be readily sold. Again, fruit so coated will of course decay if there is the slightest imperfection in the coating.

My invention contemplates the enveloping of the fruit or vegetable in a wrapper specially prepared for the purpose.

In connection with the description of my invention I desire to refer to the accompanying drawings, which illustrate the several steps followed in carrying out my invention, and in which—

Figure 2:
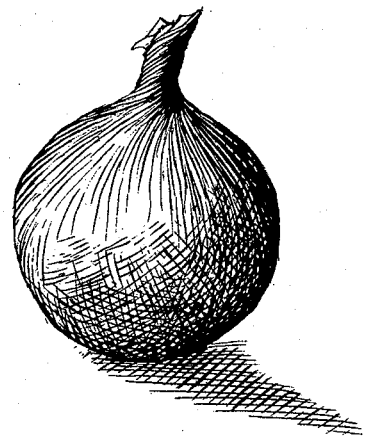

Figure 1 is a view of a plain sheet of wrapping-paper, such as is usually employed for incasing oranges; Fig. 2, an elevation showing such wrapper around any fruit, as an orange.

I make a composition of paraffine, bayberry-tallow, and spice in the following proportions: twenty-five parts of paraffine to one of tallow and a modicum of spice. These ingredients are thoroughly mingled by heating and agitation, so as to produce a liquid, into which latter the wrapping-paper is dipped; or the liquid may be allowed to cool, and the solid substance thus obtained may be evenly diffused over the wrapping-paper by any of the well-known methods by which paper is coated. The paper thus coated is to be sold as a marketable article instead of the wrapper at present used.

In packing fruit the latter is enveloped within the prepared wrapper, as shown at Fig. 2. I have kept fruit thus packed from one season to another without any loss whatever in weight, solidity, flavor, or acidity, and in fruit so preserved there is not the slightest foreign taste or flavor.

I desire to state that paraffine-paper is air and moisture tight only when it is smooth, for it cracks in myriads of places whenever it is crumpled. I therefore use just enough tallow to so temper the paraffine that it will not crack or scale when the paper is crumpled and twisted around the fruit.

I do not wish to be confined to the proportions of tallow and paraffine above set forth, because the thickness, the porosity, and the general quality of the paper would necessitate a change in these proportions. If I used a paper that was extremely soft and flexible, like tissue-paper, the proportions of tallow and paraffine would be substantially as above stated, whereas if I used a heavier stiffer paper I would increase the proportion of tallow. As I said before, this tallow is used merely as a tempering ingredient, and is therefore not a known quantity, but one changeable with different conditions. The amount of spice used is very small, since I use it simply as a seasoning, there being only a faint spicy odor to the wrapper, which odor cannot be detected on the fruit after the latter has been exposed to the air for a few minutes. The action of the spice is decided and beneficial, for it resists the evaporation of the volatile oils in the rind of the fruit, so that the latter, when exposed to the air, will have the benefit of all the volatile oils to preserve the rind from any decay earlier than is common to all fruit in its season.

For preserving fruits whose rinds are very rich in volatile oils, I use more of the spice than I would in instances where such oils abound in a less degree, and therefore I do not wish to be limited to any particular amount of spice, it being essential only to use the same in moderation.

Having thus fully described my invention, what I claim as new, and desire to secure by Letters Patent, is—

1. The herein-described means for preserving fruits and vegetables, consisting of wrapping-paper coated with a composition composed of paraffine, bayberry-tallow, and spice in substantially the proportions specified.

2. The herein-described composition of matter for use in preserving fruits, &c., consisting of paraffine, bayberry-tallow, and spice in substantially the proportions specified.

In testimony whereof I affix my signature in presence of two witnesses.

EDWARD F. AYRES.

Witnesses:
F. W. SMITH, Jr.,
J. P. FINCH.